United States Patent [19]

Crider

[11] Patent Number: 4,605,162

[45] Date of Patent: Aug. 12, 1986

[54] EMERGENCY VENTILATOR OPENER FOR LIVESTOCK HOUSES

[76] Inventor: Grantlin W. Crider, Rte. 1, Box 17, Bremen, Ala. 35033

[21] Appl. No.: 688,299

[22] Filed: Jan. 2, 1985

[51] Int. Cl.[4] .................. F24F 13/10; G05D 23/30
[52] U.S. Cl. .................. 236/49; 236/68 C; 236/90
[58] Field of Search .......... 236/49, 68 C, 68 R, 236/90; 251/129

[56] References Cited

U.S. PATENT DOCUMENTS

| | | | |
|---|---|---|---|
| 1,566,918 | 12/1925 | Parks et al. | 236/68 R X |
| 2,064,935 | 12/1936 | McFall et al. | 251/129 X |
| 2,286,156 | 6/1942 | Petersen | 236/68 R X |
| 2,329,636 | 9/1943 | McGrath | 236/68 R |
| 2,373,697 | 4/1945 | Littlefield | 251/129 X |
| 3,329,341 | 7/1967 | Jones | 236/49 X |
| 3,915,377 | 10/1975 | Sutton, Jr. | 236/49 |

*Primary Examiner*—William E. Tapolcai
*Attorney, Agent, or Firm*—Jennings, Carter, Thompson & Veal

[57] ABSTRACT

A ventilator opener for a livestock house having an electrically powered fan for ventilation utilizes a tubular electrical heater, connected to the same power source as the fan, to heat an expandable bi-metallic latch finger which thereby engages the inner surface of the tubular heater. The latch finger is operatively connected to a conventional winch which is used to lower at least one closure or curtain thereby uncovering one or more screened ventilation openings along the walls of the house. The latch finger secures the winch with the curtains in their closed positions while the finger is engaged by the heater. The latch finger is released from engagement with the tubular heater by cooling of the heater and latch finger subsequent to either electrical power failure or an excessive temperature within the livestock house, thereby releasing the winch and opening the ventilation openings.

4 Claims, 5 Drawing Figures

EMERGENCY VENTILATOR OPENER FOR LIVESTOCK HOUSES

BACKGROUND OF THE INVENTION

The present invention relates to livestock houses and more particularly to power ventilated livestock houses wherein the livestock have a low tolerance to excessive temperatures. More particularly the present invention relates to emergency ventilation of such livestock houses whereby normally closed ventilation openings may be automatically opened. In even greater particularity the present invention may be described as a thermally responsive actuator which opens the ventilator openings in the event of a power failure or excess temperatures.

U.S. Pat. No. 3,915,377 exemplifies the basic concept for automatically opening closures on ventilated livestock houses and describes in detail the conventional ventilation of such a house in columns 2 and 3. That patent discloses a device which has an auxiliary power supply, such as a battery, that powers a resistance heater in order to burn through a heat fusible cord which holds a mechanical closure mechanism in place, thereby releasing the closures. A time delay is provided by a bimetallic element to prevent inadvertent actuation of the device during brief power failure, which could potentially necessitate numerous replacements of the severed cord, and increase the probability of the severed cord causing a secondary ignition.

A later model of the same type apparatus utilizes a printed circuit board having an L-C time delay feature to prevent inadvertent openings of the closure. Although quite suitable initially, these PC board components are subject to breakage and environmental fluctuation and, as is well known, the L-C time delay tends to decay over a period of time, therefore the device may not always prevent inadvertent opening of the closures.

While the foregoing devices are suitable for their intended purpose they require a plurality of parts subject to fatigue or replacement and leave something to be desired in terms of efficiency, economy, and reliability.

SUMMARY OF THE INVENTION

It is an object of the present invention to provide a reliable means for opening the closures on a livestock house in the event of a power failure.

Another object of the invention is to provide a reliable curtain opener which can also open the closures responsive to interior temperatures.

Yet another object of the invention is to provide a curtain opener for livestock houses which requires no maintenance or replacement of expended parts.

My invention accomplishes these objects through the use of a tubular resistance heater electrically connected in parallel with the main air ventilation system for such a house. The heater has an axial bore which receives, therewithin, a thermally responsive element which expands to engage and grip the inner surface of the heater. This element is mounted on a pivotally mounted arm such that the element and arm pivot away from the heater when the electrical circuit is not energized. The pivot arm is operatively connected to a conventional mechanical winch to release said winch and open the closures when the element and arm pivot away from the heater.

DESCRIPTION OF THE DRAWINGS

Apparatus incorporating features of my invention are shown in the accompanying drawings, which form a portion of this application, wherein.

DESCRIPTION OF A PREFERRED EMBODIMENT

Livestock houses such as shown at 41 are conventionally ventilated by large electrically powered fans 31 which circulate the air longitudinally along the house. These houses also have at least one large screened ventilation opening 42 along the wall of the house which is covered by large movable curtains or closures 43. The livestock, particularly in the case of chickens, are confined in relatively close proximity and generate considerable body heat; therefore adequate ventilation is a necessity rather than a nicety. It should be apparent from the foregoing that a failure of the powered air ventilators with the ventilation openings covered by the curtain would result in excessive temperatures within the house in a relatively short time. Therefore, it is customary to provide a manual means for opening and closing the curtains. Typically this mechanical means is a winch for raising the curtains from a lowered open position.

Figure 1:
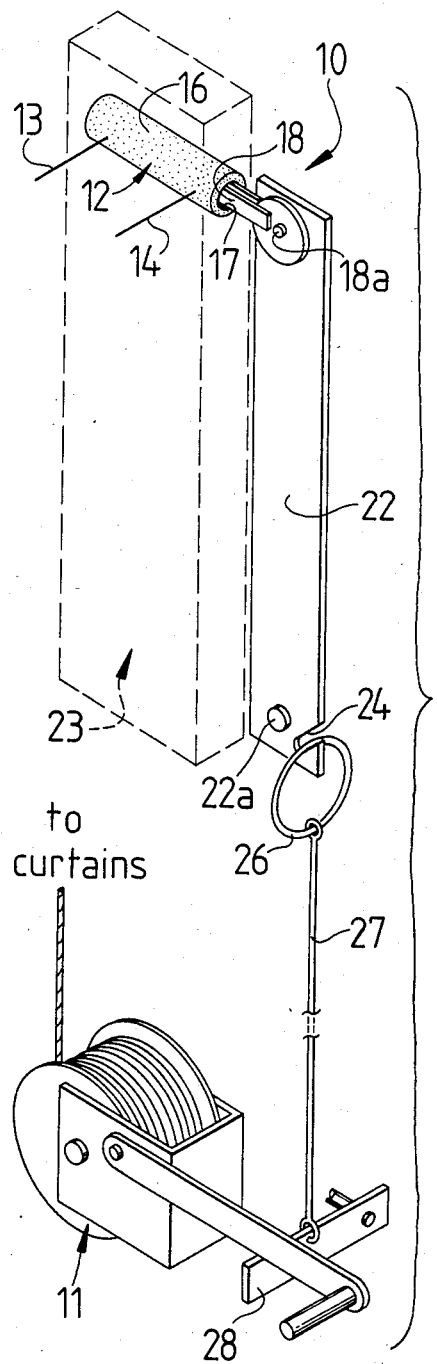
FIG. 1 is a perspective view of the invention showing the heater and pivot arm operatively connected to a mechanical winch.
Figure 2A:
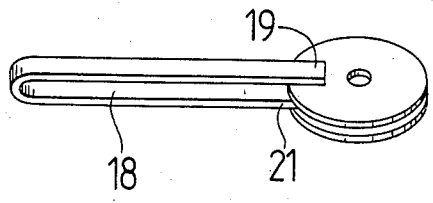
FIG. 2a shows the expansion finger of the thermally responsive element in its closed position.
Figure 2B:
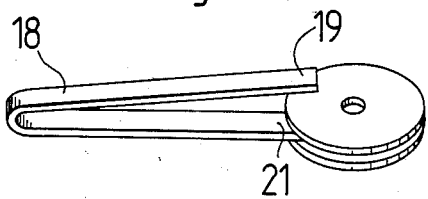
FIG. 2b shows the expansion finger in open position.
Figure 4:
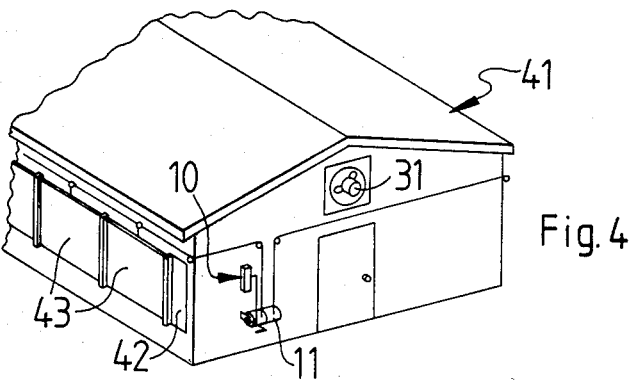
FIG. 4 is a partial perspective view of a livestock house utilizing the invention.

FIG. 1 shows my invention, generally indicated at 10, connected to a winch 11 which is shown as being restrained in a position corresponding to a full up and closed condition for the curtains. A tubular electrically powered resistance heater 12 is connected in parallel with the electrically driven ventilators 31 by power lines 13 and 14 to the power supply 32. The heater 12 has a ceramic cover 16 and an axial bore 17 and is quite durable and long-lived. The heater 12 also has a certain degree of heat retention ability in that it takes an ascertainable time to cool down after the electrical power is disconnected therefrom. An expansion finger 18 is adapted for sliding insertion within the axial bore 17. The finger 18 is a U-shaped bi-metallic strip which opens at its ends 19 and 21, as shown in FIGS. 2a and 2b, when heated. This expansion of the finger 18 causes it to engage the axial bore 17 such that the expansion finger 18 cannot be withdrawn from the heater 12 until the heater 12 and expansion finger 18 cool down.

Expansion finger 18 is pivotally mounted as at 18a to a pivot arm 22 which is also pivotally mounted as at 22a to a housing 23 at an elevation below the heater 12. Pivot arm 22 has therein an inclined outwardly opening slot 24 at its lower end proximal its attachment to the housing 23. This slot 24 receives a ring 26 which is connected to one end of a cord 27, of a predetermined length, that is attached at its other end to a pivotally mounted stop 28 which engages the actuating mechanism of the winch 11 to prevent the winch 11 from turning and thus opening the curtains 43 of the livestock house.

Figure 3:
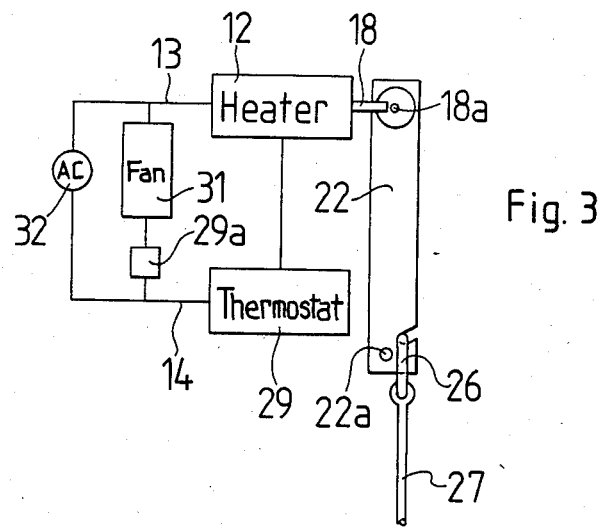
FIG. 3 is a block diagram of the heater in series with a thermostat.

It is also necessary on occasion to open the curtains, even though the forced air ventilators 31 are in operation, due to excessive temperatures in the house 41. This may be advantageously accomplished through the use of a thermostat 29 physically located to sense the temperature of the house 41 and serially connected with the heater 12 such that, when a predetermined temperature is reached, the heater circuit is opened. Usually a thermostat 29a is also provided in the line supply current to the ventilator 31, as shown in FIG. 3, to control the operation of the ventilators 31. Thermostats suitable for these purposes are commonly available and will not be further described.

In operation, the housing 23 is mounted above the conventional winch 11 in a manner which will allow the stop 28 connected to the cord 27 to engage the winch actuating mechanism. The winch 11 is used to raise the curtains 43 to their closed position and must be secured by the stop 28 to prevent the curtains 43 from falling to their open position. Power lines 13 and 14 are connected to the power supply across the fan 31 in a parallel circuit, and the expansion finger 18 is inserted into heater 12. Within about a minute expansion finger 18 firmly engages the axial bore 17. Ring 26 is inserted into the slot 24, and the lower end of cord 27 is connected to the pivotally mounted stop 28 for the winch 11 to prevent it from turning and lowering the curtains. It will be noted that pivot arm 22 provides about a 40:1 mechanical advantage to the expansion finger 18 over the ring 26, thereby enabling the device to prevent the release of the curtains 43 by the winch 11. Thermostat 29 may be serially connected in either line 13 or 14.

This configuration is maintained as long as the ventilators 31 are receiving power and the temperature within the house 41 is below a predetermined level. Upon either disruption of power or an excessive temperature within the house 41, the heater 12 begins to cool and expansion finger 18 begins to contract. If the power is not restored or the temperature lowered, as the case may be, the expansion finger 18 will be pulled from the heater 12 by the action of the winch 11 on the pivot arm 22. The winch 11 will thus be free to turn and the curtains 43 will open, thereby providing lateral ventilation to the house 41. It should be noted that the response time of this system to either triggering event is not instantaneous but rather has a built-in delay which may be adjusted by manipulating the friction fit of expansion finger 18 within the axial bore 17. This response time prevents the curtain from opening during transient power outages or temperature elevations; thus the system will provide additional ventilation only when it is actually required.

It is noteworthy to mention that the present invention requires no replaceable parts and is considerably simpler than the devices shown in the prior art. Furthermore all of the heat generation may be readily confined within the housing 23 thereby greatly reducing the potential for an accidental fire.

While I have shown my invention in but one form, it will be obvious to those skilled in the art that it is not so limited, but is susceptible of various changes and modifications without departing from the spirit thereof.

What I claim is:

1. In a livestock and poultry house having at least one ventilation opening along a wall thereof, a closure for opening and closing said ventilation opening, an electrically operated ventilation means for providing ventilation to the house and an electrical power supply, the improvement comprising:
   (a) electrically operated thermal generator means operatively connected to said power supply and having a thermal output substantially confined to the region immediately surrounding said generator means; and
   (b) latch means operatively connected to said closures and mounted for movement selectively to a first position proximal said thermal generator and to a second position distal said thermal generator and responsive to said thermal output to open said closures upon movement of said latch means to said second position, wherein said thermal generator means comprises a cylindrical resistance heater having an axial bore for receiving at least a portion of said latch means therewithin.

2. The improvement as defined in claim 1 wherein said latch means comprises an expandable bi-metallic finger adapted for insertion into said axial bore, whereby said bi-metallic finger expands transversely and retentively engages said bore responsive to the thermal output within said heater when said heater is electrically connected to said power source.

3. The improvement as defined in claim 1 further comprising a thermostat electrically connected in series with said thermal generator means and mounted for monitoring the temperature within said livestock house such that said thermostat interrupts electrical power to said thermal generator when the temperature is said house reaches a predetermined level.

4. The improvement as defined in claim 1 wherein said latch means further comprises an elongated member pivotally mounted at one end and having a second end carrying said finger which is movable to said first position and said second position, said elongated member having an outwardly opening slot therein proximal said one end, and a connector operatively connected to said closures and held within said slot when said latch is in said first position and released from said slot by movement of said latch to said second position.

* * * * *